(12) United States Patent
Ito

(10) Patent No.: US 6,997,585 B2
(45) Date of Patent: Feb. 14, 2006

(54) HEADLAMP MOUNTING STRUCTURE FOR AUTOMOBILE

(75) Inventor: Masataka Ito, Atsugi (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 70 days.

(21) Appl. No.: 10/479,853

(22) PCT Filed: Feb. 13, 2003

(86) PCT No.: PCT/JP03/01480

§ 371 (c)(1),
(2), (4) Date: Dec. 8, 2003

(87) PCT Pub. No.: WO03/076229

PCT Pub. Date: Sep. 18, 2003

(65) Prior Publication Data
US 2004/0156208 A1 Aug. 12, 2004

(30) Foreign Application Priority Data
Mar. 14, 2002 (JP) .............................. 2002-070151

(51) Int. Cl.
*B60Q 1/00* (2006.01)
*B60Q 1/26* (2006.01)
*B60Q 1/32* (2006.01)
*B60Q 11/00* (2006.01)
*B60Q 3/00* (2006.01)

(52) U.S. Cl. ...................... 362/507; 362/502; 362/505; 362/546; 362/549

(58) Field of Classification Search ................ 362/502, 362/505–507, 546, 549
See application file for complete search history.

(56) References Cited

U.S. PATENT DOCUMENTS

| | | | | |
|---|---|---|---|---|
| 4,196,459 A | * | 4/1980 | Dick ........................... | 362/549 |
| 4,333,131 A | * | 6/1982 | Hujimoto et al. ........... | 362/549 |
| 5,154,505 A | * | 10/1992 | Sasamoto ..................... | 362/549 |
| 5,420,762 A | * | 5/1995 | Lewis ......................... | 362/549 |

FOREIGN PATENT DOCUMENTS

| | | |
|---|---|---|
| DE | 37 26 834 A1 | 2/1989 |
| DE | 197 41 522 A1 | 3/1999 |
| DE | 199 46 995 A1 | 4/2000 |
| EP | 0 649 773 A1 | 4/1995 |
| EP | 1 060 945 A2 | 12/2000 |
| JP | 04113943 A * | 4/1992 |
| JP | 11-20543 | 1/1999 |
| JP | 11-48856 | 2/1999 |

* cited by examiner

Primary Examiner—Stephen Husar
Assistant Examiner—Jason Han
(74) Attorney, Agent, or Firm—McDermott Will & Emery LLP

(57) ABSTRACT

A headlamp unit (30) is mounted between opposite sides of a radiator core support panel (10) in a widthwise direction of a vehicle and a front portion of a front fender. One of a front mounting position of a front portion of the headlamp unit (30) and a rear mounting position of a rear portion of the headlamp unit (30) is provided with a fastening structure (50). The other one of the front mounting position and the rear mounting position is provided with an inserting structure (40) capable of adjusting an inserting amount. The headlamp unit (30) is allowed to slide and move by the fastening structure and/or the inserting structure, thereby making it possible to adjust a mounting position.

10 Claims, 14 Drawing Sheets

HEADLAMP MOUNTING STRUCTURE FOR AUTOMOBILE

TECHNICAL FIELD

The present invention relates to a headlamp mounting structure of an automobile.

BACKGROUND ART

In recent years, in order to simplify the assembling procedure and automate the assembling operation of a car body, a headlamp unit, a front bumper and the like are sub-assembled to a radiator core support panel, thereby forming a so-called front end module, and the front end module is assembled to a front portion of the car body on an assembling line of car body (see Japanese Patent Application Laid-open Nos. H11-20543, H11-48856).

DISCLOSURE OF INVENTION

In such a headlamp mounting structure, there is an adverse possibility that tolerances of assembling precision of the radiator core support panel, the front side member and the front fender, and tolerances of assembling precision of the radiator core support panel and the headlamp unit are accumulated, and a gap or step between a parting portion between the headlamp unit and a front end of the front fender becomes uneven. Therefore, it is proposed to make it possible to adjust a position of the headlamp unit with respect to the front fender, thereby reducing the gap or step between the parting portion and the front end of the front fender.

That is, the position of the headlamp unit is adjusted in such a manner that the headlamp unit is previously mounted to the radiator core support panel through a movable structure capable of rotating and sliding, and when the front end module is assembled, a relative position of the headlamp unit with respect to the front fender is finely adjusted.

However, even if the headlamp unit is mounted to the radiator core support panel through the movable structure, since the headlamp unit is not fixed to any of the radiator core support panel and the front fender when the front end module is assembled, an operator must hold and align the headlamp unit using his or her one hand, and mount the headlamp unit. Therefore, operability is inferior, and since the mounting position is varied depending upon operators, the precision of the mounting position is deteriorated.

It is an object of the present invention to provide a headlamp mounting structure of an automobile capable of maintaining the precision of the mounting position at high level, and capable of simplifying the mounting operation.

To achieve the above object, the present invention provides a headlamp mounting structure of an automobile comprising headlamp units mounted between opposite sides of a radiator core support panel in a widthwise direction of a vehicle and a front portion of a front fender, and rear portions of headlamps and the front fender are close to each other, the headlamp mounting structure comprising, a fastening structure or an inserting structure provided on one of a front mounting position of a front portion of the headlamp unit and a rear mounting position of a rear portion of the headlamp unit, and an inserting structure which is provided on the other one of the front mounting position and the rear mounting position and which is capable of adjusting an inserting amount, and wherein the headlamp unit is allowed to slide and move by the fastening structure and/or the inserting structure, thereby making it possible to adjust a mounting position.

BEST MODE FOR CARRYING OUT THE INVENTION

Embodiments of the present invention will be described below in detail with reference to the drawings.

Figure 1:
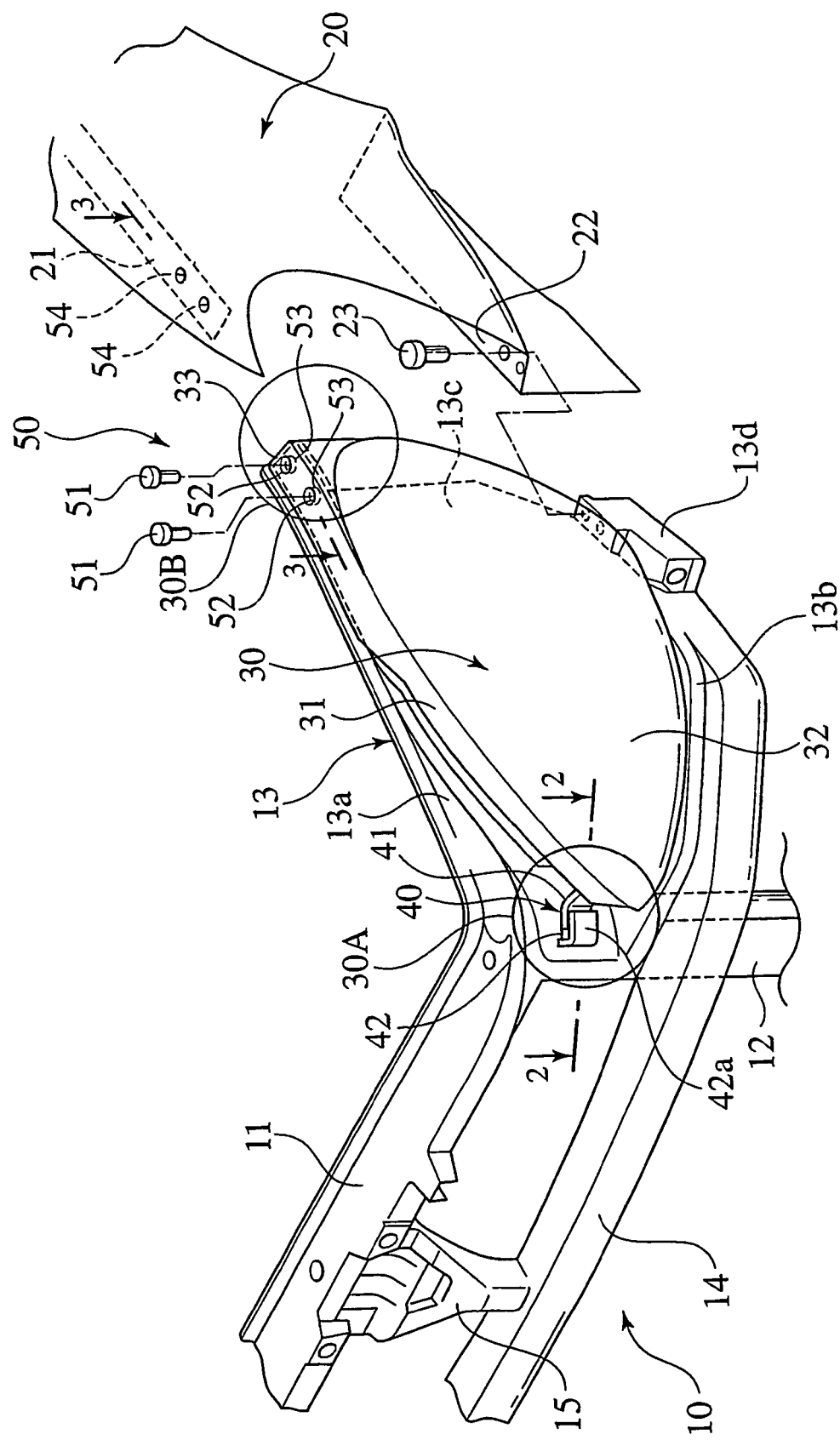
FIG. 1 is an exploded perspective view showing a headlamp mounting portion on one side of a front portion of a car body according to a first embodiment of the present invention.
Figure 2:
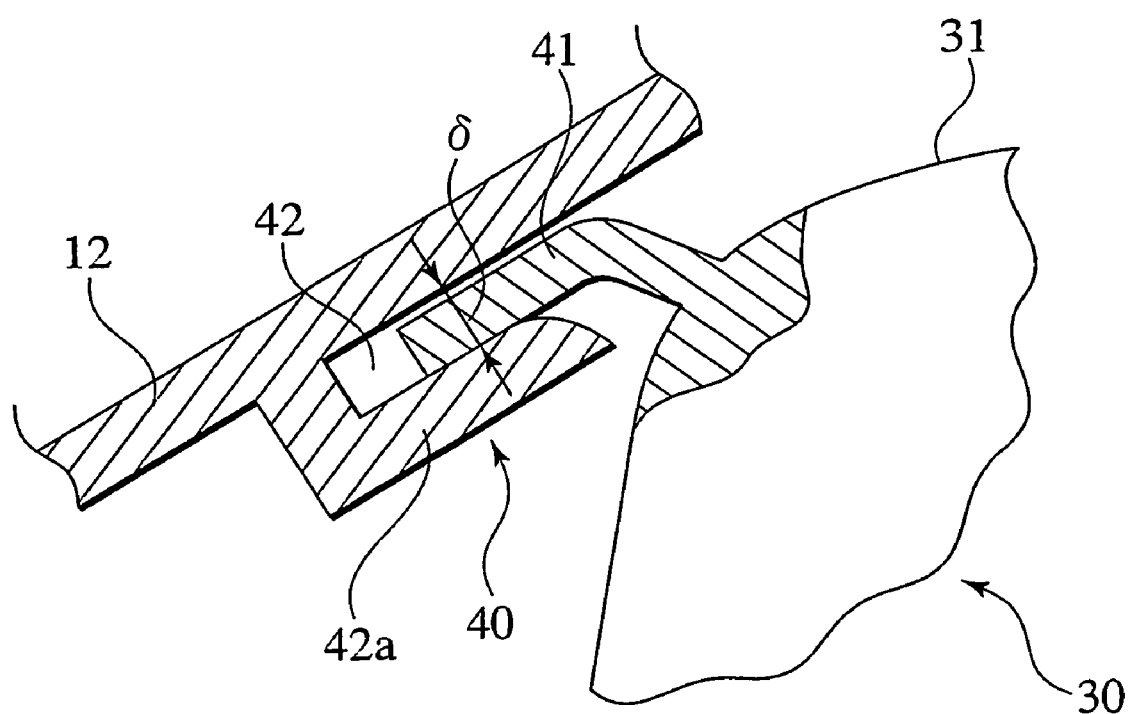
FIG. 2 is an enlarged sectional view of a front side mounting position taken along a line 2—2 in FIG. 1.
Figure 3:
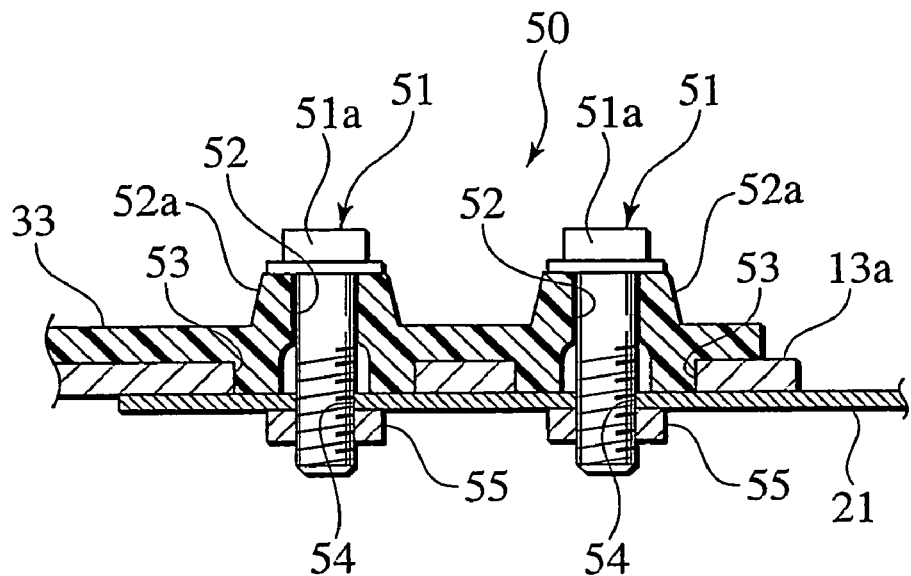
FIG. 3 is an enlarged sectional view of a rear side mounting position in an assembled state taken along a line 3—3 in FIG. 1.
Figure 4:
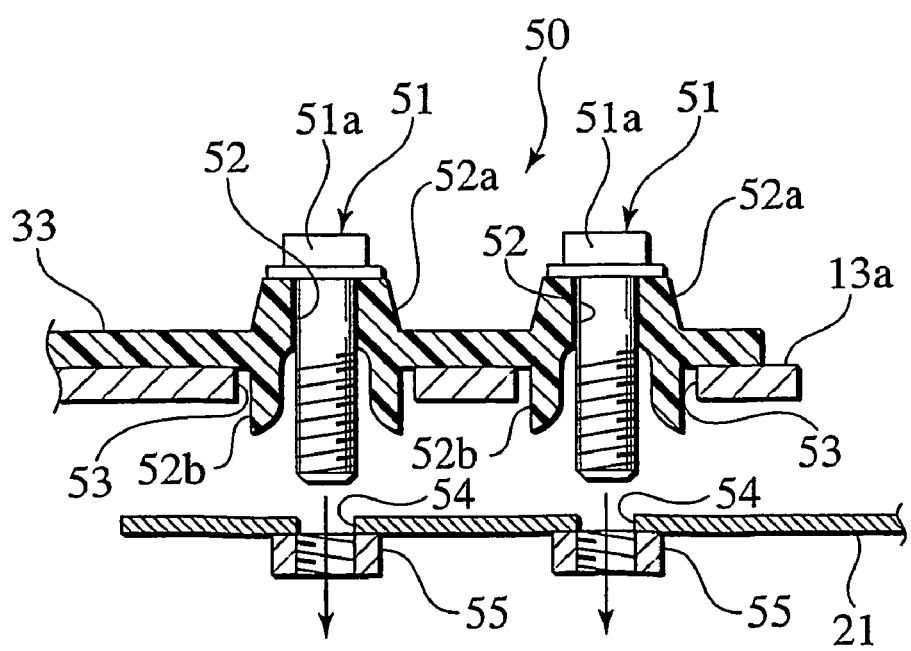
FIG. 4 is an enlarged sectional view showing the rear side mounting position in the first embodiment of the invention before assembling.

FIG. 1 to FIG. 4 show a first embodiment of a headlamp mounting structure of an automobile of the invention. FIG. 1 is an exploded perspective view showing a headlamp mounting portion on one side of a front portion of a car body according to a first embodiment of the present invention. FIG. 2 is an enlarged sectional view of a front side mounting position taken along a line 2—2 in FIG. 1. FIG. 3 is an enlarged sectional view of a rear side mounting position in an assembled state taken along a line 3—3 in FIG. 1. FIG. 4 is an enlarged sectional view showing the rear side mounting position in the first embodiment of the invention before assembling.

As shown in FIG. 1, according to the headlamp mounting structure of this embodiment, headlamp units 30 are mounted between a front portion of a front fender 20 and opposite sides of a radiator core support panel 10 in a widthwise direction of the vehicle.

The radiator core support panel 10 is coupled to skeleton structure members provided on opposite sides of a front portion of the car body in the widthwise direction of the vehicle of a front side member or the like (not shown), thereby forming a skeleton portion of a front end of the car body. The skeleton portion is provided at its upper portion with an upper rail 11 extending in the widthwise direction of the vehicle, and first cross members (not shown) disposed in parallel at a predetermined distance from each other below the upper rail 11.

The upper rail 11 and opposite sides of the first cross member in the widthwise direction of the vehicle are continuously connected with each other through a pillar 12. A side portion 13 is provided outward of the pillar 12 in the widthwise direction of the vehicle for mounting the headlamp unit 30.

The side portion 13 includes an upper frame 13a integrally formed as an extending portion of the upper rail 11, a lower frame 13b integrally provided such as to project from the pillar 12 in a lateral direction, and a side frame 13c for connecting the upper frame 13a and the lower frame 13b with each other. The side portion 13 is curved outward such as to incline from the upper rail 11 and the pillar 12 rearward of the car body.

Therefore, The side portions 13 extend rearward from opposite ends of the upper rail 11 forming an upper main skeleton of the radiator core support panel 10 at a predetermined angle. A rear end of the upper frame 13a as this extending portion is superposed on an upper surface of a front end of an upper flange 21 formed inside the front fender 20 and is fastened thereon through bolts 51 and 51.

A seat 13d is formed on an outside of the lower frame 13b of the side portion 13. The seat 13d is superposed on a lower surface of a front end of a lower flange 22 formed on an inside of the front fender 20 and is fastened thereto by a bolt 23.

Meanwhile, in this embodiment, an armature 14 of a front bumper (not shown) is integrally formed astride the left and right pillars 12 such as to curve toward the lower frame 13b of the side portion 13. A hood lock stay 15 is integrally formed astride the upper rail 11 and a central portion of the armature 14 in the widthwise direction of the vehicle.

Here, the headlamp units 30 are mounted between opposite sides of the radiator core support panel 10 in the widthwise direction of the vehicle and a front portion of the front fender 20 through a front mounting position 30A of the front portion and a rear mounting position 30B of the rear portion. The headlamp units 30 are constituted as known generally in such a manner that lamps (not shown) are accommodated in interiors tightly closed by a housing 31 and a lens 32 covering a front surface of the housing 31.

In this first embodiment, the front mounting position 30A is of an inserting structure 40, and the rear mounting position 30B is of a fastening structure 50.

As shown in FIG. 2, the inserting structure 40 comprises a flange portion 41 as an inserting portion projecting from the housing 31 of the headlamp unit 30 along a mounting direction of the headlamp unit 30, and a receiving portion 42 which is provided on an outer surface of the pillar 12 and into which the flange portion 41 is fitted.

The flange portion 41 projects such as to incline from a front end of the housing 31 forward of the vehicle and inward along the mounting direction of the headlamp unit 30. The receiving portion 42 has an L-shaped projection 42a projecting from a side surface of the pillar 12. A gap δ substantially corresponding to a thickness of the flange portion 41 is formed between the side portion 13 and the L-shaped projection 42a. The flange portion 41 is tightly inserted into the gap δ, and bonding surfaces between the flange portion 41 and the receiving portion 42 are inclined outward of the vehicle and rearward.

An appropriate margin is provided between an inserting-side tip end of the flange portion 41 and a bottom of the receiving portion 42 for absorbing forming error or assembling error of the headlamp unit 30 so that the inserting amount can be adjusted.

The fastening structure 50 has a mounting flange 33 extending rearward from an upper side of an intermediate portion of the housing 31 of the headlamp unit 30 as shown in FIG. 1, and the mounting flange 33, an upper frame (extending portion) 13a of the radiator core support panel 10, and the upper flange 21 of the front fender 20 are fastened and fixed to each other by means of two mounting bolts 51 and 51.

The mounting flange 33 of the headlamp unit 30 is disposed on the uppermost side and the upper flange 21 of the front fender 20 is disposed on the lowermost side. The upper frame 13a of the radiator core support panel 10 is disposed between the mounting flange 33 and the upper flange 21. The mounting flange 33, the upper frame 13a and the upper flange 21 are formed at their front and rear portions with bolt-inserting holes 52, 53 and 54 two each for the two bolts 51 and 51.

A periphery of the bolt-inserting hole 52 of the mounting flange 33 is formed with a boss 52a at a portion (upper side) closer to the head 51a of the b51. An annular projection 52b is formed below a position where headlamp-fixing members such as the upper flange 21 and the upper frame 13a are disposed.

The bolt-inserting hole 52 of the mounting flange 33 has substantially the same diameter as that of the bolt 51 so that the bolt-inserting hole 52 is tight for the bolt 51. A weld nut 55 as a female screw is fixed to a lower surface of the bolt-inserting hole 54 of the upper flange 21, and the bolt-inserting hole 54 is tight for the bolt 51.

The bolt-inserting hole 53 of the upper frame 13a sandwiched between the mounting flange 33 and the upper flange 21 has a large diameter hole having a moving margin so that the bolt-inserting hole 53 can relatively moved with respect to the bolt 51 and the annular projection 52b.

The projecting amount of the annular projection 52b is greater than a thickness of the upper frame 13a, a tip end of the annular projection 52b becomes gradually thin in thickness so that the tip end can be crushed and deformed by a fastening force of the bolt 51.

In the headlamp mounting structure of this embodiment as explained above, the radiator core support panel 10 is coupled to the front side member forming the front skeleton structure member of the car body on the assembling line and then, the headlamp unit 30 is mounted through the front mounting position 30A and the rear mounting position 30B.

At that time, the front mounting position 30A is of the inserting structure 40 comprising the flange portion 41 and the receiving portion 42, and the rear mounting position 30B is of the fastening structure 50 comprising the bolts 51 and 51. Therefore, first, the headlamp unit 30 is disposed between the radiator core support panel 10 and the front fender 20, a tip end of the flange portion 41 of the inserting structure 40 is aligned with an inlet port of the receiving portion 42 to push the headlamp unit 30 forward, thereby inserting the flange portion 41 into the receiving portion 42 as shown in FIG. 2. With this, the headlamp unit 30 is temporarily held by the side portion 13 of the radiator core support panel 10.

Next, as shown in FIG. 4, at the rear mounting position 30B, the mounting flange 33, the upper frame 13a and the upper flange 21 are superposed on one another in this order, the bolt-inserting holes 52, 53 and 54 are aligned with one another, the bolts 51 are inserted from above, and the screw portion 51b is threadedly engaged with the weld nut 55 and fastened.

Then, as shown in FIG. 3, the annular projection 52b is pushed by an upper surface of the upper flange 21 by the fastening operation of the bolt 51 and crushed and deformed. The annular projection 52b is pushed and spread in the bolt-inserting hole 53 of the upper frame 13a whose diameter is increased, and the annular projection 52b is brought into contact with a peripheral surface of the bolt-inserting hole 53 under pressure. Therefore, the radiator core support panel 10 is allowed to slide within the margin having the same diameter as that of the bolt-inserting hole 53, so that alignment is carried out automatically. With this, the position of the headlamp unit 30 is adjusted the normal mounting position, and the mounting operation is completed.

At that time, the inserting direction of the inserting structure 40 is along the mounting direction of the headlamp unit 30, and the mating surface of the inserting structure 40 is inclined outward of the vehicle and rearward. Therefore, when the mounting operation is completed, the headlamp unit 30 is inclined in a preset predetermined direction and is fixed in that state.

According to this embodiment, the headlamp unit 30 can be temporarily held by the radiator core support panel 10 by the inserting operation of the portion of the inserting structure 40. In this temporally holding state, the fastening operation of the bolt 51 is carried out by the portion of the fastening structure 50. With this, the headlamp unit 30 can stably be mounted and thus, the mounting operability can be enhanced.

Further, the annular projection 52b is crushed and deformed by fastening the bolt 51, the annular projection 52b is brought into contact with the peripheral surface of the bolt-inserting hole 53 of the radiator core support panel 10 under pressure, the radiator core support panel 10 slides and moves in the margin having the same diameter of the bolt-inserting hole 53 so that the alignment is carried out automatically. Therefore, the mounting position of the headlamp unit 30 can be adjusted with reference to the front fender 20, and the precision of the mounting position can be enhanced.

This crushed annular projection 52b is curved around the bolt 51 or curved such as to fill the bolt-inserting hole 53 whose diameter was increased. Therefore, the bolt 51 can be fastened more reliably.

Further, the fastening structure 50 fastens and fixes the mounting flange 33, the upper frame 13a and the upper flange 21 by means of the bolt 51. By this common fastening operation using the bolt 51, the headlamp unit 30 can be fixed to both the radiator core support panel 10 and the front fender 20 at the same time, and the front fender 20 can directly be fixed to the radiator core support panel 10. Therefore, the mounting strength of the headlamp unit 30 can be further enhanced.

Figure 5:
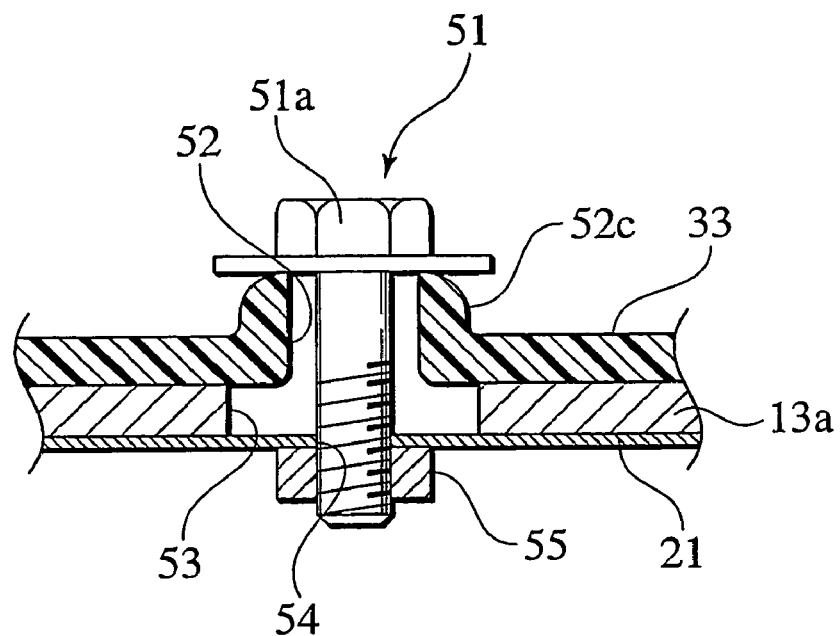
FIG. 5 is an enlarged sectional view showing a state before fastening by bolts in a second embodiment of the invention.

In the above description, according to the fastening structure 50, the annular projection 52b downwardly projects, and is crushed by fastening the bolt 51, thereby automatically carrying out the alignment. However, as shown in FIG. 5 showing the enlarged sectional view of the bolt fixing portion, a diameter of the bolt-inserting hole 52 of the mounting flange 33 can be made greater than that of the bolt 51, and the annular projection 52c which is crushed by fastening the bolt 51 can be formed on the side of the head 51a of the bolt 51 of the mounting flange 33.

Figure 6:
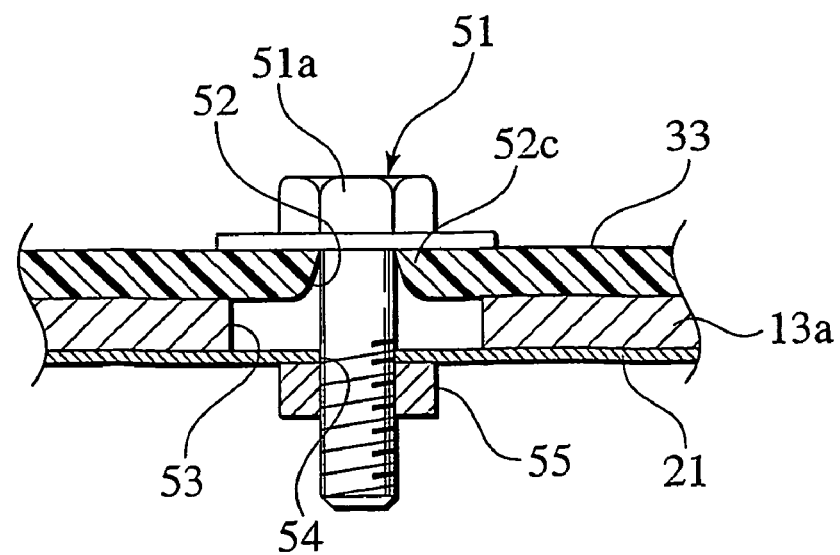
FIG. 6 is an enlarged sectional view showing a state after fastening by the bolt in the second embodiment of the invention.

In the case of the second embodiment, if the annular projection 52c is crushed, the annular projection 52c is reduced in diameter in a direction of the center as shown in the enlarged sectional view of FIG. 6 so that the annular projection 52c is brought into contact with a bolt shaft portion under pressure. Therefore, the headlamp unit 30 slides and moves within the margin having the same diameter as that of the bolt-inserting hole 52, the automatic alignment is carried out, and the same effect as that described above can be obtained.

Figure 7:
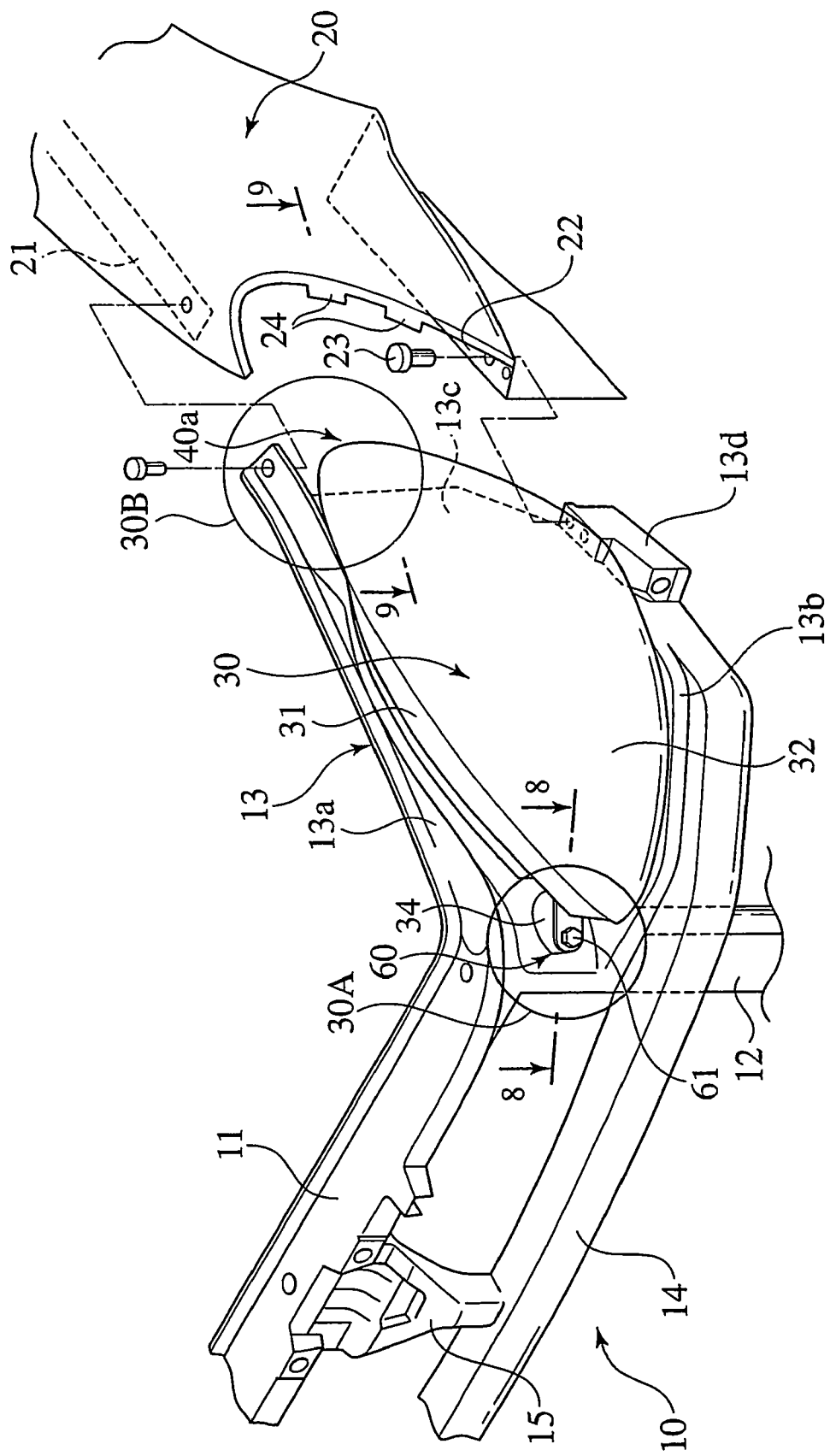
FIG. 7 is an exploded perspective view showing a headlamp mounting portion on one side of a front portion of a car body according to a third embodiment of the invention.
Figure 8:
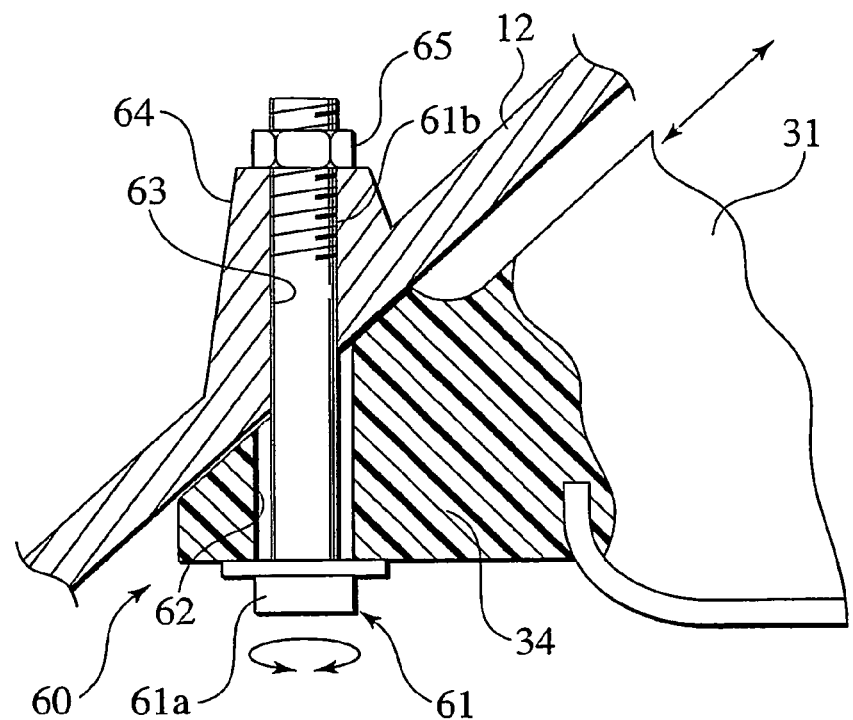
FIG. 8 is an enlarged sectional view of a front side mounting position taken along a line 8—8 in FIG. 7.
Figure 9:
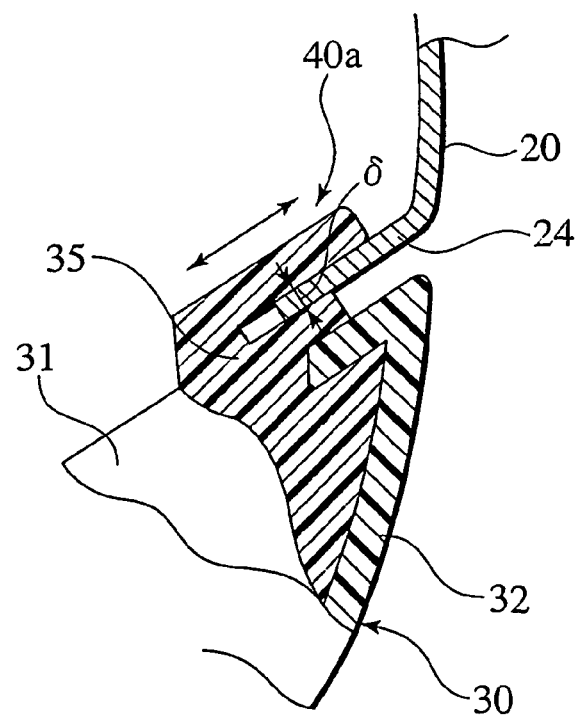
FIG. 9 is an enlarged sectional view of an assembled state of a rear side mounting position taken along a line 9—9 in FIG. 7.

FIG. 7 to FIG. 9 show a third embodiment, the same constituent portions as those of the previous embodiment are designated with the same symbols, and redundant explanation is omitted.

FIG. 7 is an exploded perspective view showing a headlamp mounting portion on one side of a front portion of a car body. FIG. 8 is an enlarged sectional view of a front side mounting position taken along a line 8—8 in FIG. 7. FIG. 9 is an enlarged sectional view of an assembled state of a rear side mounting position taken along a line 9—9 in FIG. 7.

According to the headlamp mounting structure of the third embodiment, the front mounting position 30A is a fastening structure 60, and the rear mounting position 30B is an inserting structure 40a.

As shown in FIG. 8, in the fastening structure 60 of the front mounting position 30A, a thick projection 34 projecting from a front end of the housing 31 of the headlamp unit 30 and a side portion of the pillar 12 of the radiator core support panel 10 are fastened and fixed by a bolt 61. The mating surfaces of the side portion of the pillar 12 and the thick projection 34 are inclined outward of the vehicle and rearward.

The bolt-inserting hole 62 of the thick projection 34 is a large-diameter hole having a moving margin which can be relatively moved with respect to a bolt 60. A bolt-inserting hole 63 of the other pillar 12 has substantially the same diameter as that of the bolt 61 so that the bolt-inserting hole 63 is tight for the bolt 60. The bolt-inserting hole 63 passes through a boss 64 projecting from an inner side of the pillar 12.

As shown in FIG. 9, the inserting structure 40a of the rear mounting position 30B comprises a flange portion 24 extending from a front end of the front fender 20, and a receiving portion 35 which is provided in a rear end of the housing 31 of the headlamp unit 30 and into which the flange portion 24 is fitted. Mating surfaces of the flange portion 24 and the receiving portion 35 are also inclined outward of the vehicle and rearward at the same inclining angle as that of the mating surface of the fastening structure 60.

The flange portion 24 is formed by bending a front end of the front fender 20 along the mounting direction of the headlamp unit 30. The receiving portion 35 is formed by notching a rear end of the housing 31 through a gap δ corresponding to a thickness of the flange portion 24.

In this case also, an appropriate margin is provided between an inserting-side tip end of the flange portion 24 and a bottom of the receiving portion 35 so that forming error or assembling error of the headlamp unit 30 can be absorbed.

According to the headlamp mounting structure of the third embodiment, the headlamp unit 30 is pushed rearward, and the flange portion 24 of the inserting structure 40a is inserted into the receiving portion 35, so that the headlamp unit 30 is temporarily held by the front fender 20. Therefore, in this temporarily holding state, alignment is carried out such that the bolt-inserting holes 62 and 63 of the fastening structure 60 are brought into communication, and the bolt 61 is inserted, and its screw portion 61b is threadedly engaged into a nut 65 disposed on the end of the boss 64 and is fastened.

Then, since the bolt-inserting hole 62 of the thick projection 34 is the large-diameter hole having the moving margin, the thick projection 34 moves diagonally with respect to the pillar 12 with the fastening operation of the mounting bolt 61, and since this moving amount can be adjusted according to the fastening amount of the bolt 61, the mounting position of the headlamp unit 30 can be adjusted.

Therefore, the third embodiment can exhibit the same effect as that of the first embodiment.

If the inserting amount of the flange portion 24 of the inserting structure 40a into the receiving portion 35 is previously limited, it is possible to fix the headlamp unit 30 at a constant position.

Figure 10:
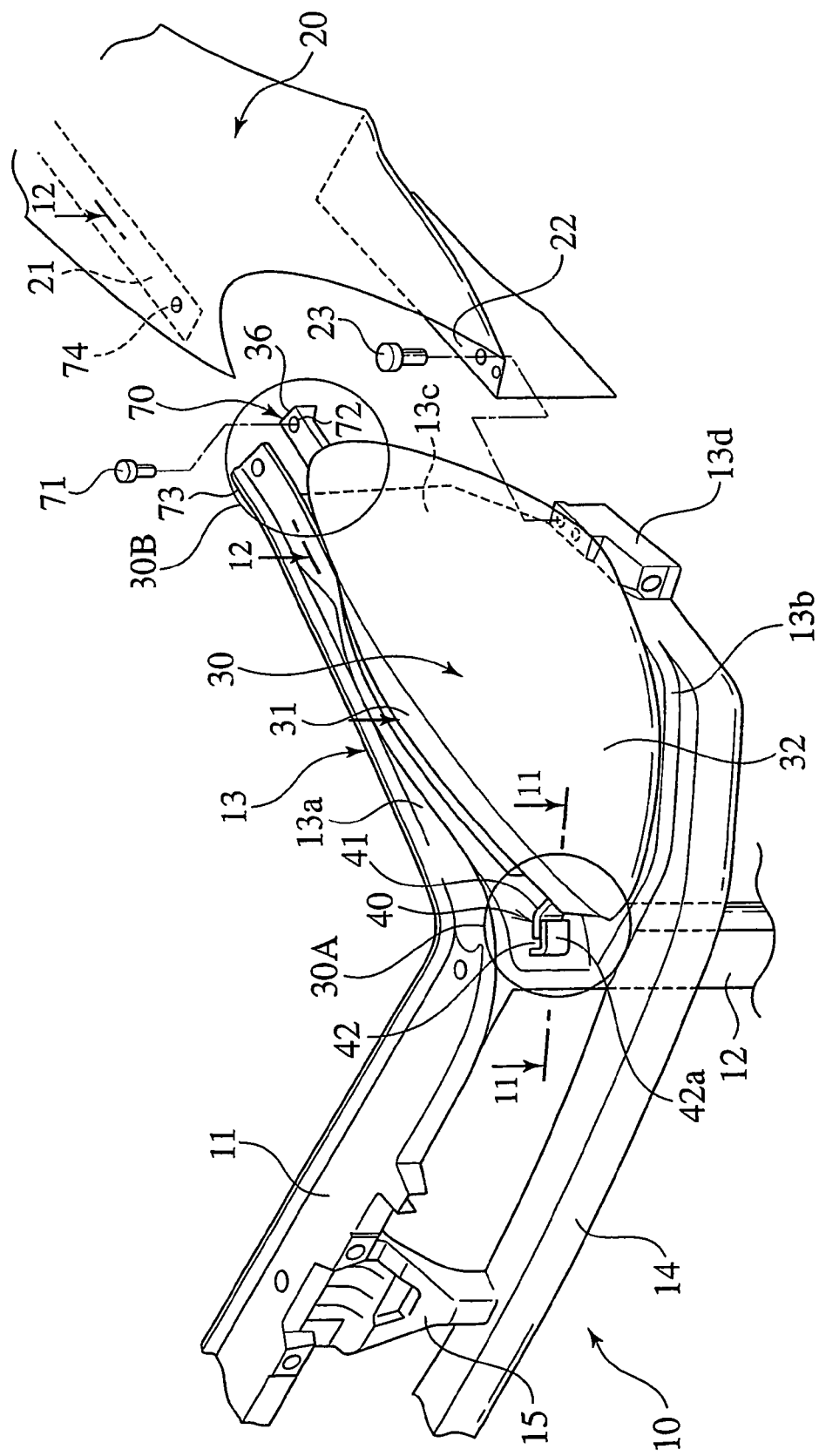
FIG. 10 is an exploded perspective view showing a headlamp mounting position on one side of a front portion of a car body according to a fourth embodiment of the invention.
Figure 11:
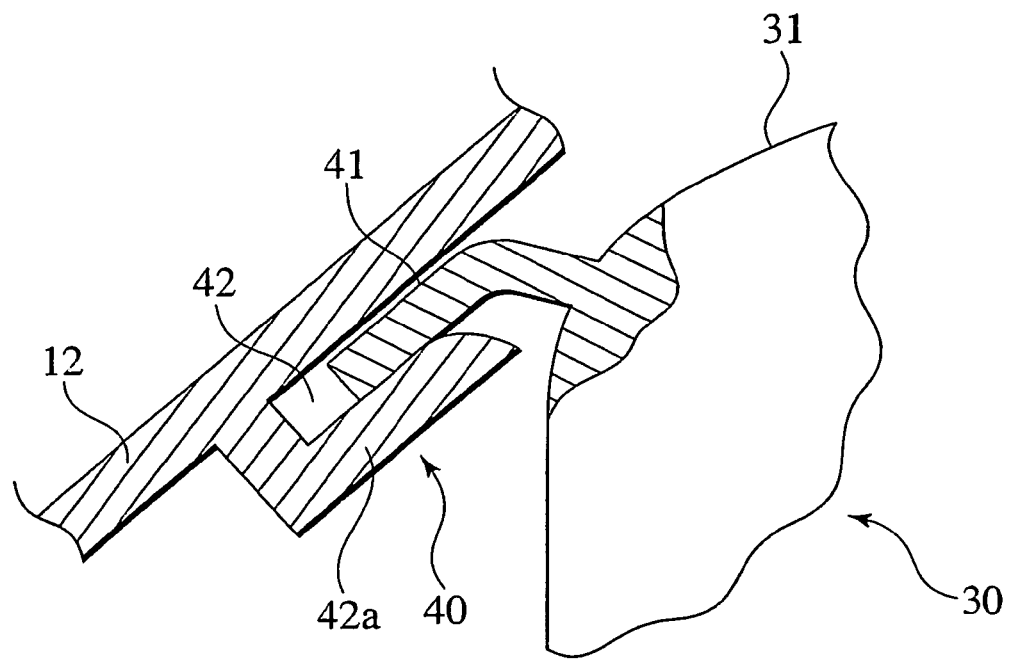
FIG. 11 is an enlarged sectional view of a front side mounting position taken along a line 11—11 in FIG. 10.
Figure 12:
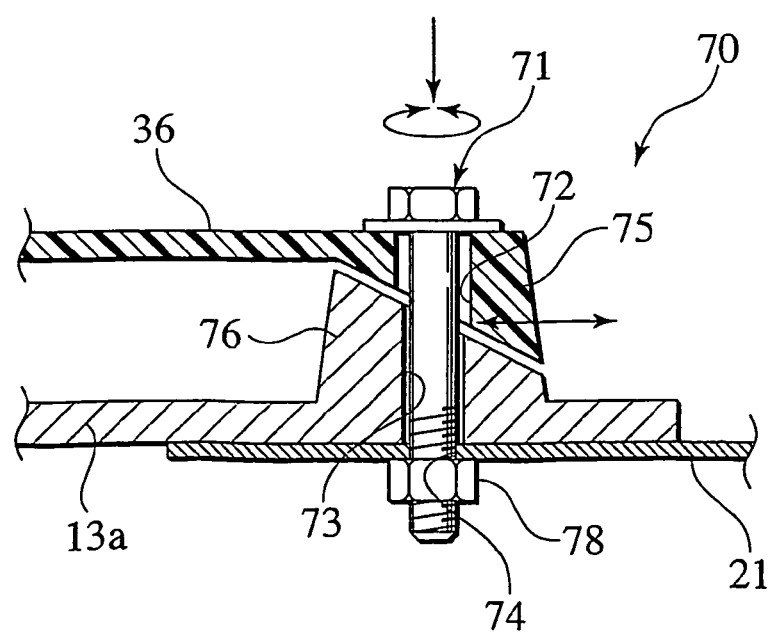
FIG. 12 is an enlarged sectional view of the rear side mounting position in its assembled state taken along a line 12—12 in FIG. 10.

FIG. 10 to FIG. 12 show a fourth embodiment, the same constituent portions as those of the previous embodiment are designated with the same symbols, and redundant explanation is omitted.

FIG. 10 is an exploded perspective view showing a headlamp mounting position on one side of a front portion of a car body. FIG. 11 is an enlarged sectional view of a front side mounting position taken along a line 11—11 in FIG. 10. FIG. 12 is an enlarged sectional view of the rear side mounting position in its assembled state taken along a line 12—12 in FIG. 10.

According to a headlamp mounting structure of the fourth embodiment which is the reverse equivalent of the third embodiment, the front mounting position 30A is the inserting structure 40 and the rear mounting position 30B is a fastening structure 70.

In this case, although the inserting structure 40 of the front mounting position 30A is shown in FIG. 11, since the inserting structure 40 has the same structure as that of the first embodiment shown in FIG. 2, its explanation is omitted.

The fastening structure 70 of the rear mounting position 30B comprises a screw adjusting mechanism. As shown in FIGS. 10 and 12, a mounting flange 36 extends rearward from an upper side of an intermediate portion of the housing 31 of the headlamp unit 30, and as shown in FIG. 12, the mounting flange 36, the upper frame 13a of the radiator core support panel 10, and the upper flange 21 of the front fender 20 are superposed from above in this order, and these are fastened by a bolt 71 which passes through the bolt-inserting holes 72, 73 and 74 respectively formed in the mounting flange 36, the upper frame 13a and the upper flange 21.

The mounting flange 36 and mating surfaces of the bosses 75 and 76 formed on peripheries of the bolt-inserting holes 72 and 73 are inclined with respect to a mating surface of the inserting structure 40 along the mounting direction of the headlamp unit 30 at the same inclining angle.

The bolt-inserting hole 72 of the mounting flange 36 is a large-diameter hole having a margin capable of relatively moving with respect to the bolt 71. The bolt-inserting holes 73 and 74 of the upper frame 13a and the upper flange 21 have substantially the same diameter as the bolt 71 so that the holes 73 and 74 are tight for the bolt 71.

According to the headlamp mounting structure of the fourth embodiment, if the inserting structure 40 of the front mounting position 30A of the headlamp unit 30 is inserted, the headlamp unit 30 is temporarily held by the radiator core support panel 10. Therefore, if the mounting bolt 71 of the fastening structure 70 of the rear mounting position 30B is fastened, the headlamp unit 30 can be mounted stably.

At that time, like the third embodiment, as the mounting bolt 71 is fastened, since the headlamp unit 30 slides and moves along the inclined mating surface, the mounting position of the headlamp unit 30 can be adjusted.

Figure 13:
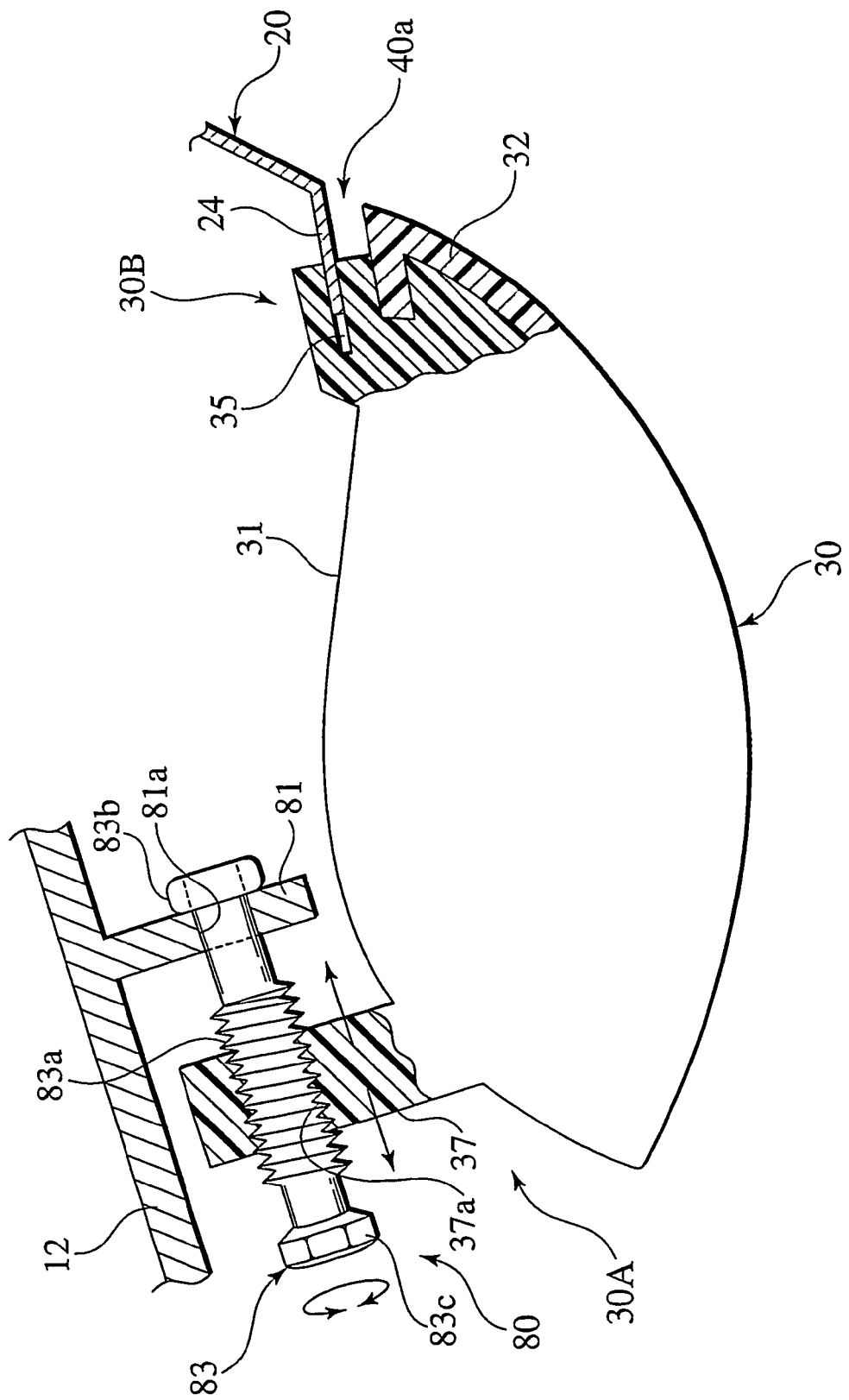
FIG. 13 is a schematic plan sectional view showing a headlamp mounting structure according to a fifth embodiment of the invention.

FIG. 13 shows a fifth embodiment, the same constituent portions as those of the previous embodiments are designated with the same symbols, and redundant explanation is omitted.

FIG. 13 is a schematic plan sectional view showing a headlamp mounting structure. According to the headlamp mounting structure of the fifth embodiment, the front mounting position 30A is a screw adjusting mechanism 80 as a fastening structure, and the rear mounting position 30B is the inserting structure 40a.

In the screw adjusting mechanism 80 of the front mounting position 30A, a projection 37 projects from an inside of the front end of the housing 31 of the headlamp unit 30, and a supporting projection 81 projecting from a side surface of the pillar 12 of the radiator core support panel 10 such as to be opposed to the projection 37 at a predetermined distance from each other. A bolt 83 is disposed astride the projection 37 and the supporting projection 81.

More specifically, a bolt 83 is formed at its intermediate portion with a screw 83a. A tip end of the bolt 83 is rotatably inserted into an insertion hole 81a of the supporting projection 81. The tip end is retrofitted with a retaining ring 83b for preventing the bolt 83 from falling out. The screw 83a is threadedly engaged into the screw hole 37a of the projection 37, and if ahead 83c of the bolt 83 is rotated, a relative position of the projection 37 can be changed with respect to the supporting projection 81.

At that time, the relative moving direction of the headlamp unit 30 by the bolt 83 is an inserting direction of the inserting structure 40a.

The inserting structure 40a of the rear mounting position 30B has the same structure as that of the third embodiment shown in FIG. 9, its explanation is omitted.

According to the headlamp mounting structure of the fifth embodiment, since the headlamp unit 30 can be temporarily held by the radiator core support panel 10 by means of the screw adjusting mechanism 80, if the inserting operation is carried out in the portion of the inserting structure 40*a* in this temporarily holding state, the headlamp unit 30 can stably be mounted.

By adjusting operation of the screw adjusting mechanism 80, the mounting position of the headlamp unit 30 can be adjusted with reference to the front fender 20, and the mounting position precision of the headlamp unit 30 can be enhanced.

FIG. 14 to FIG. 17 show a sixth embodiment, the same constituent portions as those of the previous embodiment are designated with the same symbols, and redundant explanation is omitted.

Figure 14:
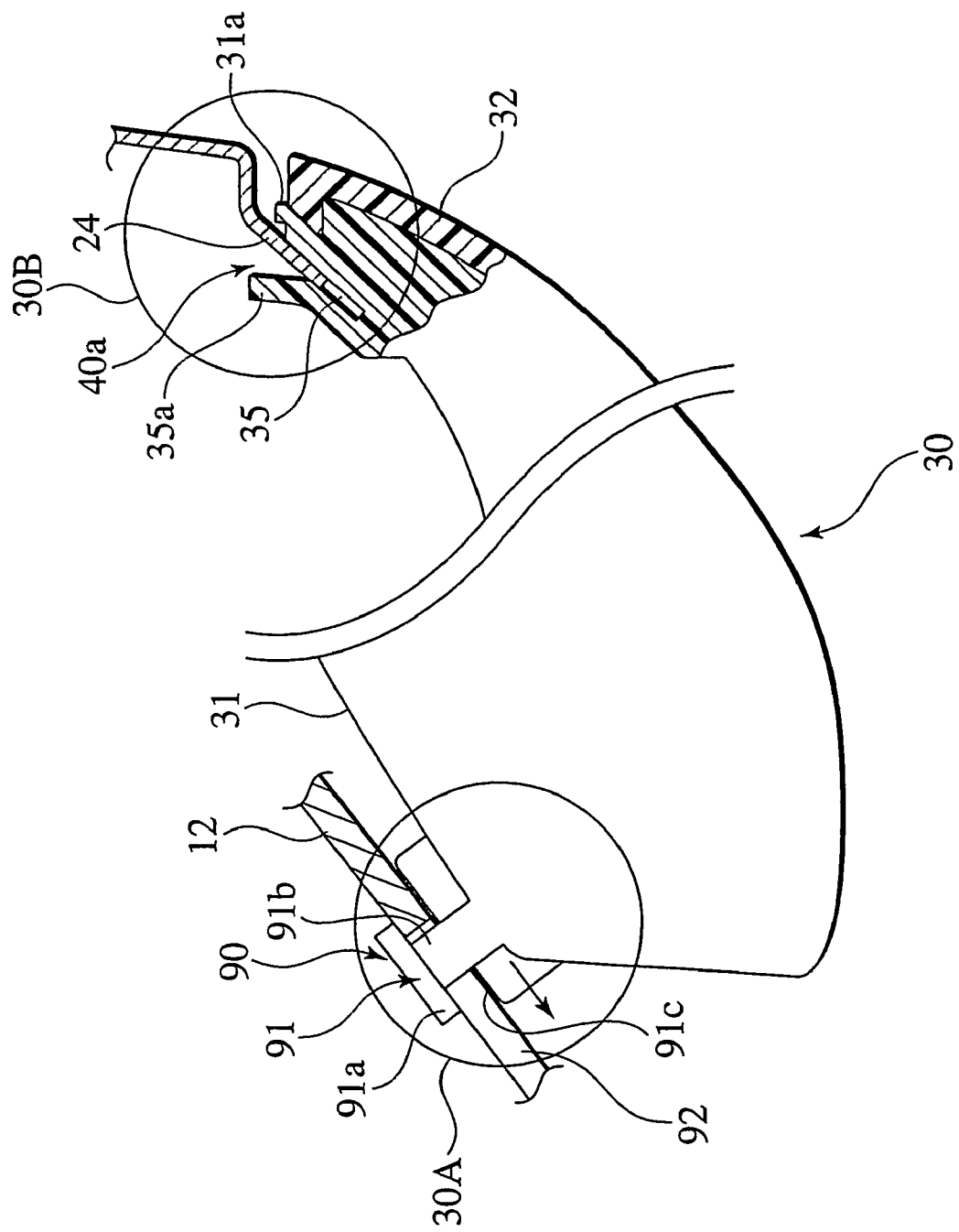
FIG. 14 is a schematic plan sectional view showing a headlamp mounting structure according to a sixth embodiment of the invention.
Figure 15:
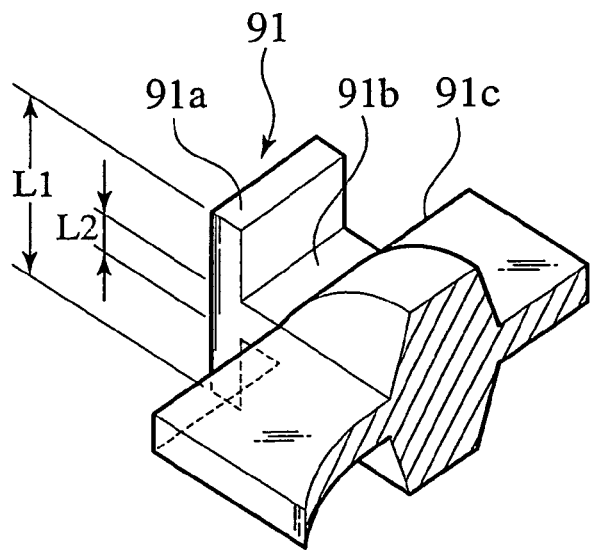
FIG. 15 is a perspective view showing a detent projection according to the sixth embodiment of the invention.
Figure 16:
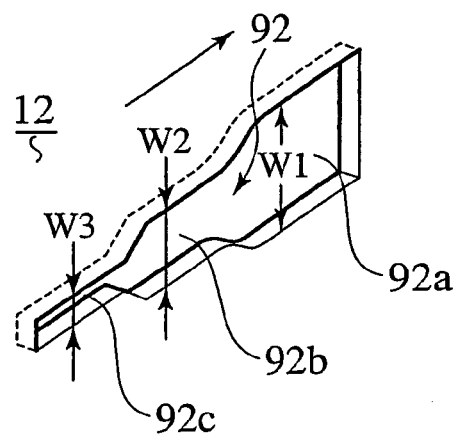
FIG. 16 is a perspective view showing an engaging hole of the sixth embodiment of the invention.
Figure 17:
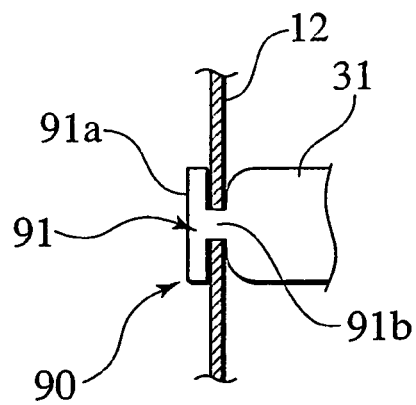
FIG. 17 is a sectional view showing an engaged state of a second inserting structure of the sixth embodiment of the invention.

FIG. 14 is a schematic plan sectional view showing a headlamp mounting structure. FIG. 15 is a perspective view showing a detent projection. FIG. 16 is a perspective view showing an engaging hole. FIG. 17 is a sectional view showing an engaged state of a second inserting structure.

According to the headlamp mounting structure of the fifth embodiment, the front mounting position 30A is a second inserting structure 90, and the rear mounting position 30B is a first inserting structure 40*a*.

The second inserting structure 90 of the front mounting position 30A comprises a detent projection 91 projecting inward from a front end of the housing 31 of the headlamp unit 30, and an engaging hole 92 which is formed in a side of the pillar 12 of the radiator core support panel 10, and is tapered in the opposite direction (forward) from the inserting direction (rearward in this embodiment). This tapered portion of the engaging hole 92 is engaged with the detent projection 91.

As shown in FIG. 15, the detent projection 91 is provided at its tip end with a retaining piece 91*a*, and with a supporting portion 91*b* of the retaining piece 91*a*, and the detent projection 91 is formed into substantially a T-shape in a projecting manner. Further, the detent projection 91 is formed at its base portion with a guiding surface 91*c* which slides on an outer surface of the pillar 12. The guiding surface 91*c* is separated from the retaining piece 91*a* at a distance corresponding to a thickness of the pillar 12.

As shown in FIG. 16, the engaging hole 92 is formed by continuously connecting a maximum width portion 92*a*, an intermediate width portion 92*b* and a minimum width portion 92*c* in a stepwise manner from a rear portion to a front portion of the engaging hole 92 in this order. A width W1 of the maximum width portion 92*a* is greater than a length L1 of the retaining piece 91*a* in the retaining direction, a width W2 of the intermediate width portion 92*b* is intermediate between the length L1 of the retaining piece 91*a* in the retaining direction and a thickness L2 of the supporting portion 91*b*, and a width W3 of the minimum width portion 92*c* is substantially equal to a thickness L2 of the supporting portion 91*b*.

A mating surface at which the guiding surface 91*c* and the pillar 12 abut against each other is inclined outward of the vehicle rearward along the mounting direction of the headlamp unit 30 like the mating surface of the inserting structure 40*a* of the rear mounting position 30B.

The inserting structure 40*a* of the rear mounting position 30B has the same structure as that of the third embodiment shown in FIG. 9 and thus, its main explanation is omitted. In the case of the inserting structure 40*a* of this sixth embodiment, one side portion 35*a* of an inserting port of the receiving portion 35 is outwardly opened, and functions as an insertion guide portion for a tip end of the flange portion 24, and a projection 31*a* projects from a rear end of the housing 31 of the headlamp unit 30 for adjusting a gap between the rear end and the front fender 20.

According to the headlamp mounting structure of the sixth embodiment, since the headlamp unit 30 can be temporarily held by the front fender 20 by the inserting operation at the portion of the first inserting structure 40*a*, by carrying out the inserting and engaging operation in the portion of the second inserting structure 90 comprising the detent projection 91 and the engaging hole 92, the headlamp unit 30 can stably be mounted.

By sliding and moving the headlamp unit 30 by the portion of the second inserting structure 90 in a direction opposite from the inserting direction of the first inserting structure 40*a*, it is possible to adjust the entering amount of the supporting portion 91*b* of the detent projection 91 and the minimum width portion 92*c* of the engaging hole 92, thereby adjusting the mounting position of the headlamp unit 30. Therefore, the precision of the mounting position can be enhanced.

Figure 18:
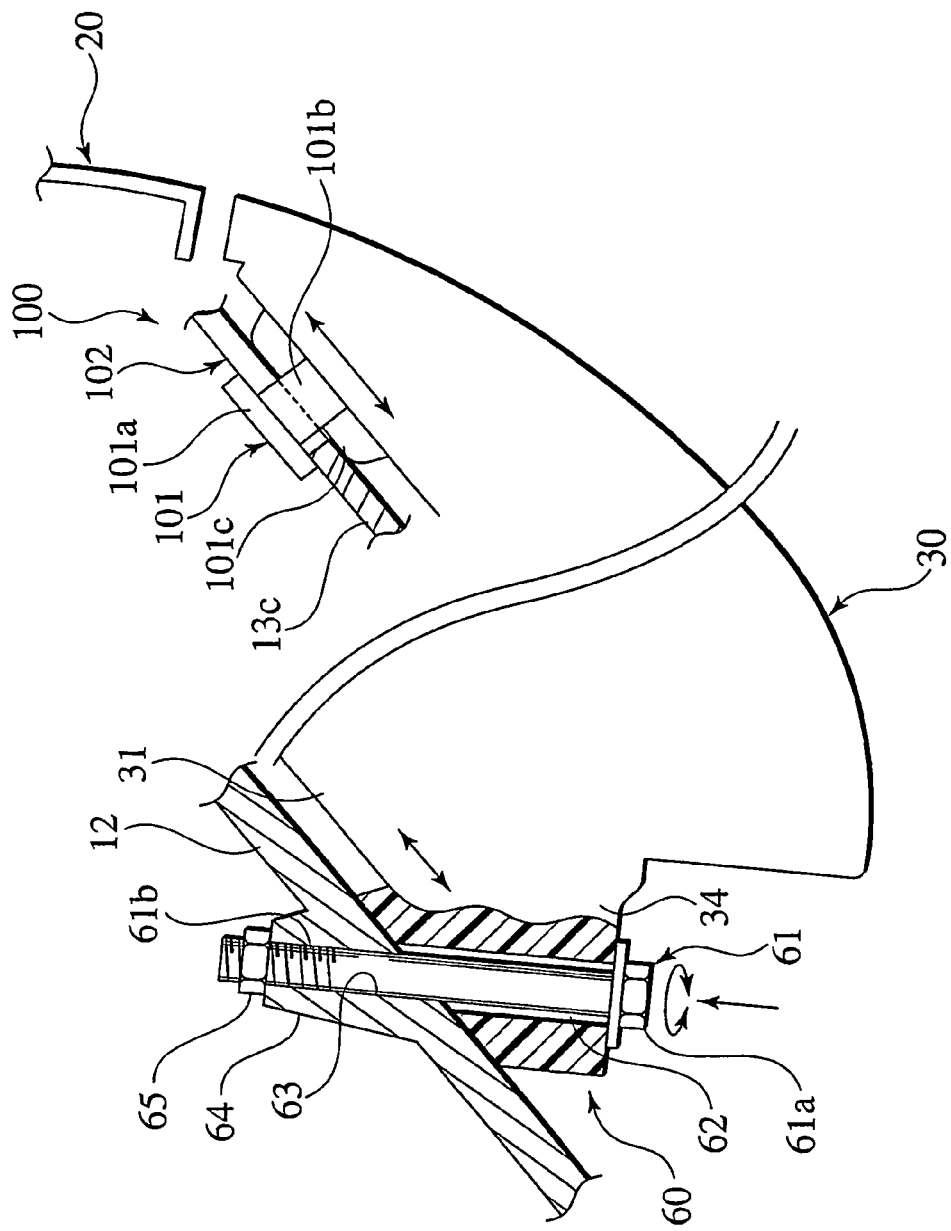
FIG. 18 is a schematic plan sectional view showing a headlamp mounting structure according to a seventh embodiment of the invention.
Figure 19:
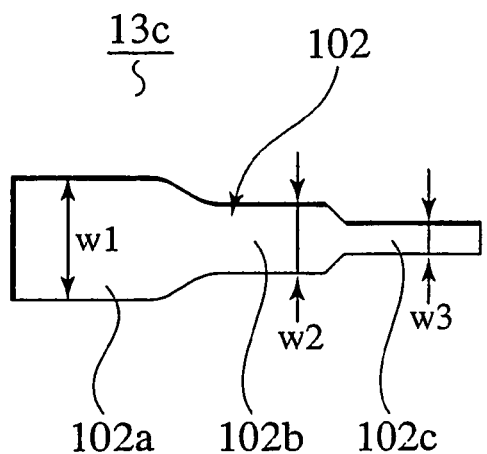
FIG. 19 is a front view showing an engaging hole of the inserting structure of the seventh embodiment of the invention.

FIG. 18 and FIG. 19 show a seventh embodiment, the same constituent portions as those of the previous embodiment are designated with the same symbols, and redundant explanation is omitted.

FIG. 18 is a schematic plan sectional view showing a headlamp mounting structure. FIG. 19 is a front view showing an engaging hole of the inserting structure.

In the headlamp mounting structure of the seventh embodiment, the front mounting position 30A is a fastening structure 60, and the rear mounting position 30B is an inserting structure 100.

The fastening structure 60 of the front mounting position 30A has the same structure as that of the third embodiment shown in FIG. 8 and thus, its explanation is omitted.

The inserting structure 100 of the rear mounting position 30B includes a detent projection 101 which projects from an inside of a rear end of the housing 31 of the headlamp unit 30, and an engaging hole 102 which is formed in the side frame 13*c* of the radiator core support panel 10 and is tapered in the inserting direction of the headlamp unit 30. The tapered portion of the engaging hole 102 is engaged with the detent projection 101.

The detent projection 101 and the engaging hole 102 have substantially the same structure as those of the detent projection 91 and the engaging hole 92 of the second inserting structure 90 in the sixth embodiment. As shown in FIG. 18, the detent projection 101 is provided at its tip end with a retaining piece 101*a*, and with a supporting portion 101*b* of the retaining piece 101*a*, and the detent projection 101 is formed into substantially a T-shape in a projecting manner. Further, the detent projection 101 is formed at its base portion with a guiding surface 101*c* which slides on an outer surface of the side frame 13*c*. The guiding surface 101*c* is separated from the retaining piece 101*a* at a distance corresponding to a thickness of the side frame 13*c*.

As shown in FIG. 19, the engaging hole 102 is formed by continuously connecting a maximum width portion 102*a*, an intermediate width portion 102*b* and a minimum width portion 102*c* in a stepwise manner from a front portion to a rear portion of the engaging hole 102 in this order. Like the second inserting structure 90 in the sixth embodiment, widths W1, W2 and W3 of these portions are set gradually smaller with a relation between the length of the retaining piece 101*a* in the retaining direction and the thickness of the supporting portion 101*b*.

In this case also, the side frame 13*c* against which the guiding surface 101 abuts is oriented in a direction along the mounting direction of the headlamp unit 30.

According to the headlamp mounting structure of the seventh embodiment, the headlamp unit 30 can be temporarily held by the radiator core support panel 10 by the inserting and engaging operation of the inserting structure 100 of the rear mounting position 30B. Therefore, if the fastening operation of the bolt 61 is carried out at the portion of the fastening structure 60 in this temporary holding state, the headlamp unit 30 can stably be mounted and thus, the mounting operability can be enhanced.

Further, by fastening the bolt 61, the headlamp unit 30 slides and moves with respect to the radiator core support panel 10 within the margin having the same diameter as that of the bolt-inserting hole 62, the mounting position of the radiator core support panel 10 can be adjusted to its normal position, and the mounting position precision can be enhanced.

Figure 20:
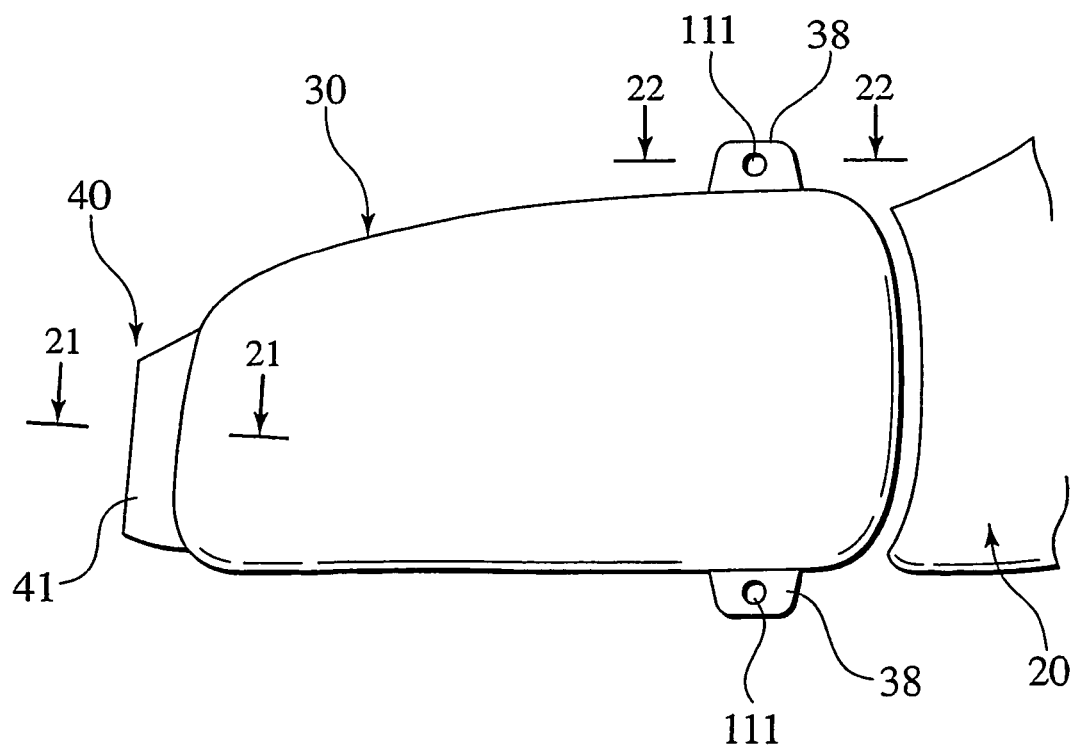
FIG. 20 is a front view showing a mounting portion of a headlamp unit of an eighth embodiment of the invention.
Figure 22:
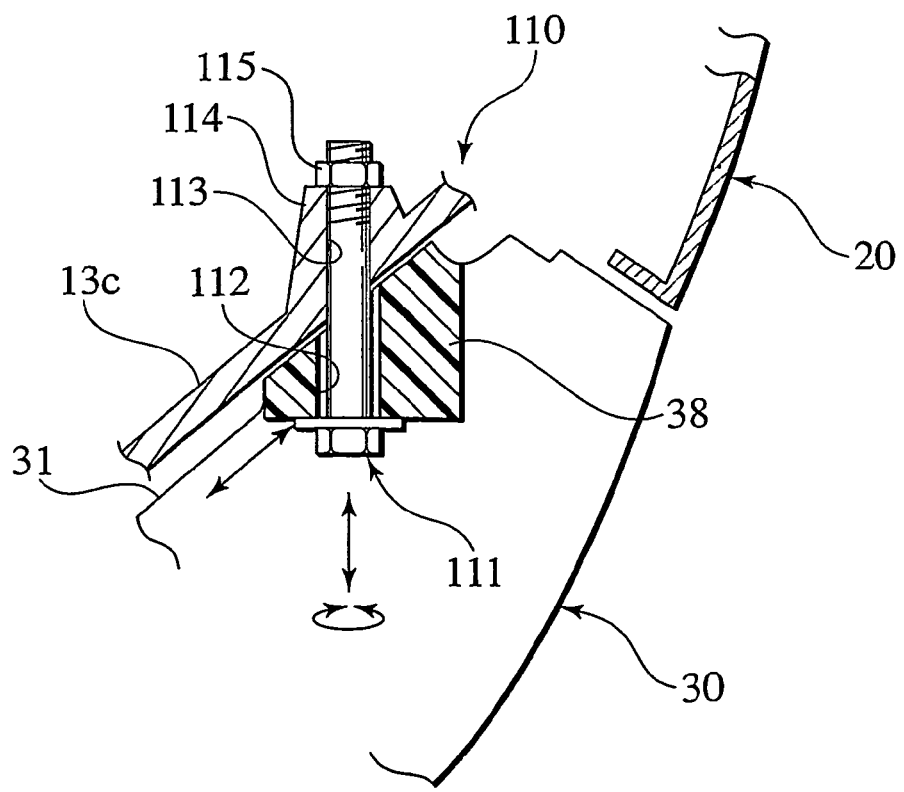
FIG. 22 is an enlarged sectional view taken along a line 22—22 in FIG. 20.

FIG. 20 and FIG. 22 show an eighth embodiment, the same constituent portions as those of the previous embodiment are designated with the same symbols, and redundant explanation is omitted.

Figure 21:
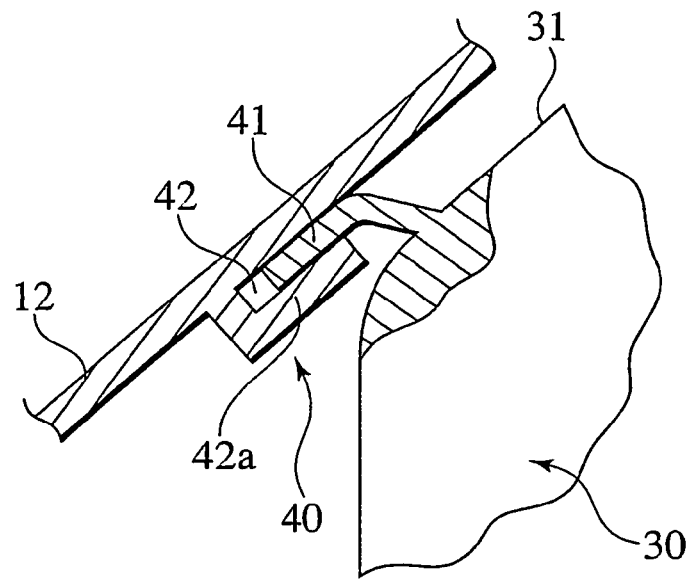
FIG. 21 is an enlarged sectional view taken along a line 21—21 in FIG. 20.

FIG. 20 is a front view showing a mounting portion of a headlamp unit. FIG. 21 is an enlarged sectional view taken along a line 21—21 in FIG. 20. FIG. 22 is an enlarged sectional view taken along a line 22—22 in FIG. 20.

According to the headlamp mounting structure of the eighth embodiment, the front mounting position 30A is an inserting structure 40, and the rear mounting position 30B is a fastening structure 110.

In this case, since the inserting structure 40 of the front mounting position 30A shown in FIG. 21 has the same structure as that of the first embodiment shown in FIG. 2, its explanation is omitted.

The fastening structure 110 of the rear mounting position 30B comprises a screw adjusting mechanism, rear upper and lower portions of the headlamp unit 30 are fastened. As shown in FIG. 22, a thick projection 38 projecting rear upper portion of the housing 31 of the headlamp unit 30 is superposed on a rear portion of the side frame 13*c* of the radiator core support panel 10, and they are fastened to each other by a bolt 111 which passes through bolt-inserting holes 112 and 113 formed in the thick projection 38 and the side frame 13*c*, respectively.

The bolt-inserting hole 113 of the side frame 13*c* passes through a boss 114, and has substantially the same diameter as that of the bolt 111 so that the bolt-inserting hole 113 is tight for the bolt 111. The bolt-inserting hole 112 passing through the thick projection 38 has a large diameter with a margin.

The mating surface between the thick projection 38 and the side frame 13*c* is of course inclined outward of the vehicle and rearward along the mounting direction of the headlamp unit 30.

According to the headlamp mounting structure of the eighth embodiment, the headlamp unit 30 can be temporarily held by the radiator core support panel 10 by the inserting operation of the inserting structure 40. Therefore, if the fastening operation of the bolt 111 is carried out at the portion of the fastening structure 110 in the temporary holding state, the headlamp unit 30 can be mounted stably, and the mounting operability can be enhanced.

Further, if the bolt 111 is fastened, the headlamp unit 30 slides and moves with respect to the radiator core support panel 10 within the margin having the same diameter as that of the bolt-inserting hole 112, the mounting position of the radiator core support panel 10 can be adjusted to its normal position, and the precision of the mounting position can be enhanced.

Japanese Patent Application No. 2002-70151 is expressly incorporated herein by reference in its entirety.

INDUSTRIAL APPLICABILITY

It is possible to provide a headlamp mounting structure of an automobile capable of maintaining the precision of the mounting position at high level, and capable of simplifying the mounting operation.

What is claimed is:

1. A headlamp mounting structure of an automobile comprising headlamp units mounted between opposite sides of a radiator core support panel in a widthwise direction of a vehicle and a front portion of a front fender, wherein the rear portions of the headlamps and the front fender are close to each other, the headlamp mounting structure comprising:
   a front mounting position of a front portion of the headlamp unit and the radiator core support panel are formed into an inserting structure capable of adjusting an inserting amount, whereby a mating surface of the inserting structure is inclined outward of the vehicle and rearward,
   a rear mounting position of a rear portion of the headlamp unit is formed into a fastening structure which superposes the headlamp unit, the radiator core support panel and the front fender on one another and integrally fastening the same,
   wherein a diameter of a bolt-inserting hole on the side of the radiator core support panel of the fastening structure is set greater than that of a bolt, and
   wherein a periphery of the bolt-inserting hole of the headlamp is provided with an annular projection which abuts against a surface of the front fender and which can be crushed and deformed by fastening the bolt, the annular projection is crushed and deformed by fastening the bolt to bring the annular projection into contact with a peripheral surface of the bolt-inserting hole of the radiator core support panel under pressure, the radiator core support panel is allowed to slide and move within the margin having the same diameter as that of the bolt-inserting hole to carry out automatic alignment, thereby making it possible to adjust the mounting position.

2. A headlamp mounting structure of an automobile according to claim 1, wherein
   the fastening structure is formed into a screw adjusting mechanism in which the headlamp unit can relatively move in the inserting direction of the inserting structure.

3. A headlamp mounting structure of an automobile according to claim 2, wherein
   the screw adjusting mechanism includes a mounting flange of the headlamp unit, an upper frame of the radiator core support panel, a flange of the front fender and the bolt for fastening the mounting flange of the headlamp unit, the upper frame of the radiator core support panel and the flange of the front fender,
   a mating surface of the mounting flange and a boss of the upper frame are inclined along a mounting direction of the headlamp unit at the same angle as that of a mating surface of the inserting structure.

4. A headlamp mounting structure of an automobile according to claim 2, wherein
   the screw adjusting mechanism includes a thick projection formed on the headlamp unit, a side frame of the radiator core support panel, and the bolt for fastening these elements.

5. A headlamp mounting structure of an automobile according to claim 1, wherein the inserting structure has a detent projection and an engaging hole into which the detent projection can be inserted and engaged, the engaging hole being tapered in a longitudinal direction and the tapered portion of the engaging hole being engaged with the detent projection.

6. A headlamp mounting structure of an automobile comprising headlamp units mounted between opposite sides of a radiator core support panel in a widthwise direction of a vehicle and a front portion of a front fender, wherein the rear portions of the headlamps and the front fender are close to each other, headlamp mounting structure comprising:

a front mounting position of a front portion of the headlamp unit and the radiator core support panel are formed into an inserting structure capable of adjusting an inserting amount, whereby a mating surface of the inserting structure is inclined outward of the vehicle and rearward, a rear mounting position of a rear portion of the headlamp unit is formed into a fastening structure which superposes the headlamp unit, the radiator core support panel and the front fender on one another and integrally fastening the same, wherein a diameter of a bolt-inserting hole on the side of the headlamp unit of the fastening structure is set greater than that of a bolt, wherein a periphery of the bolt-inserting hole of the headlamp unit is provided with an annular projection which abuts against a bolt head surface and can be brought into contact with a bolt shaft under pressure, and wherein the annular projection is crushed and deformed by fastening the bolt to bring the annular projection into contact with the bolt shaft under pressure, the headlamp unit is allowed to slide and move within the margin having the same diameter as that of the bolt-inserting hole to carry out automatic alignment, thereby making it possible to adjust the mounting position.

7. A headlamp mounting structure of an automobile according to claim 6, wherein the fastening structure is formed into a screw adjusting mechanism in which the headlamp unit can relatively move in the inserting direction of the inserting structure.

8. A headlamp mounting structure of an automobile according to claim 7, wherein the screw adjusting mechanism includes a mounting flange of the headlamp unit, an upper frame of the radiator core support panel, a flange of the front fender and the bolt for fastening the mounting flange of the headlamp unit, the upper frame of the radiator core support panel and the flange of the front fender, a mating surface of the mounting flange and a boss of the upper frame are inclined along a mounting direction of the headlamp unit at the same angle as that of a mating surface of the inserting structure.

9. A headlamp mounting structure of an automobile according to claim 7, wherein the screw adjusting mechanism includes a thick projection formed on the headlamp unit, a side frame of the radiator core support panel, and the bolt for fastening these elements.

10. A headlamp mounting structure of an automobile according to claim 6, wherein the inserting structure has a detent projection and an engaging hole into which the detent projection can be inserted and engaged, the engaging hole being tapered in a longitudinal direction and the tapered portion of the engaging hole being engaged with the detent projection.

* * * * *